(Model.)
E. E. SEELEY.
ANIMAL TRAP.
No. 414,331. Patented Nov. 5, 1889.
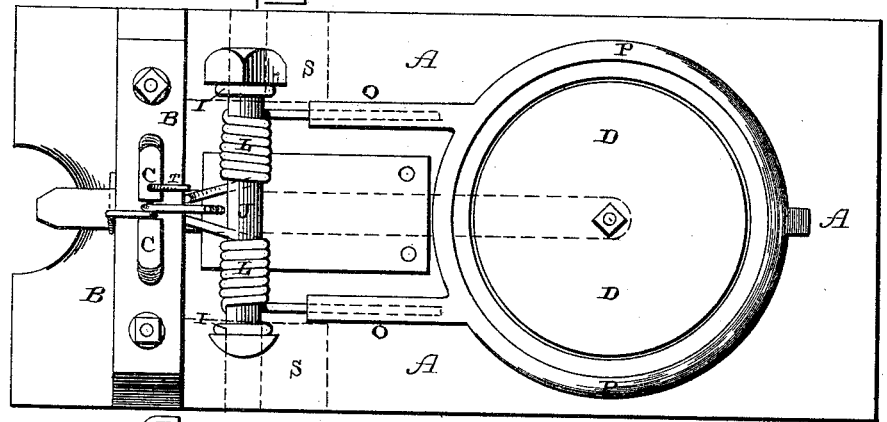
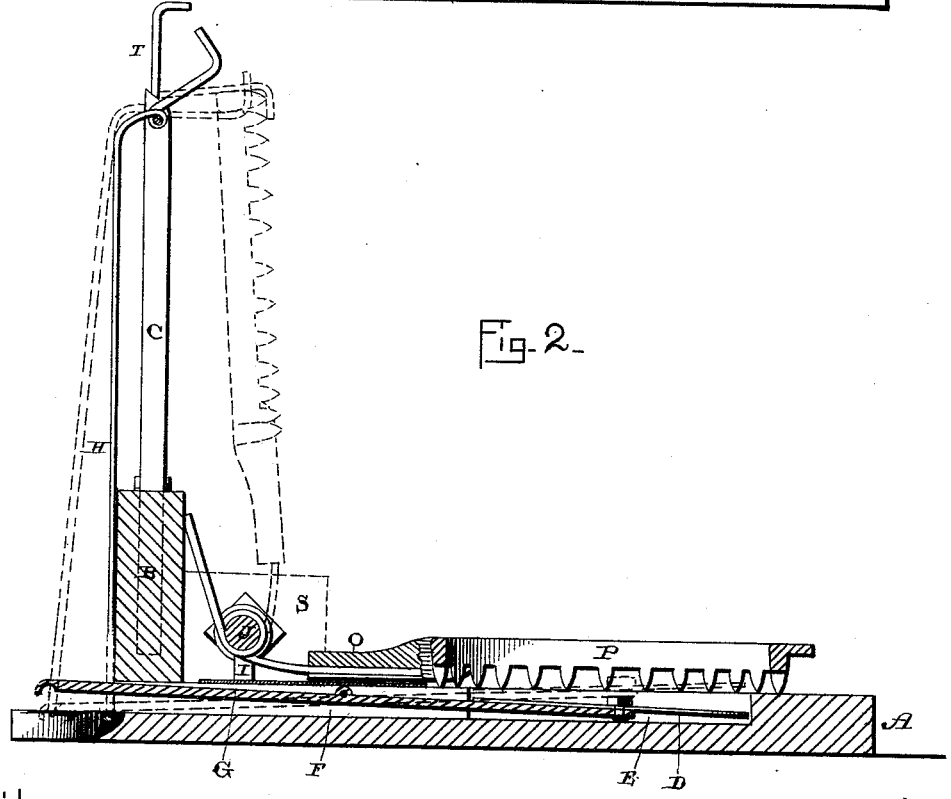

UNITED STATES PATENT OFFICE.

ELMER E. SEELEY, OF CONNEAUTVILLE, PENNSYLVANIA.

ANIMAL-TRAP.

SPECIFICATION forming part of Letters Patent No. 414,331, dated November 5, 1889.

Application filed July 16, 1889. Serial No. 317,712. (Model.)

*To all whom it may concern:*

Be it known that I, ELMER E. SEELEY, of Conneautville, in the county of Crawford and State of Pennsylvania, have invented certain new and useful Improvements in Animal-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in animal-traps; and the objects of my invention are to provide a trap in which the jaw is provided with sharp points on its under side, so as to catch and hold the animals, and to provide a plate upon which the bait is placed and which will set the trigger off at the slightest touch, so that the jaw will descend and catch an animal which is even running across the top of the plate.

Figure 1 is a plan view of a trap which embodies my invention. Fig. 2 is a vertical section showing the parts in one position in solid lines and in another position in dotted lines.

A represents the board or base of the trap, which has secured to it at one end a block B, provided with openings in which the standard C is held. In the center of the board A, near its outer end, is made a suitable recess, in which the plate D is placed and has its movement, and extending from this circular recess E in which the plate is placed is a groove F, in which the operating-lever G is placed. This lever is pivoted in the groove F, and has the plate D secured to its inner end and the trigger H attached to its outer one, where it projects beyond the inner end of the base A. The groove F is preferably covered by a piece of sheet metal, so as to prevent dirt or other articles from falling in and interfering with the movement of the lever G.

Rising from the base A near the standard C are two supports I, in which the bolt J is rigidly secured. Wrapped around opposite ends of this bolt J are the two springs L, which have their upper ends to bear against the block B, while their inner ends are inserted into grooves made in the under side of the arms O, which project rearwardly from the circular toothed jaw P. The sides of the grooves are made thin, and after the ends of the springs have been inserted the sides are turned over and then soldered or otherwise secured, so as to hold the ends of the springs rigidly. The jaw is made circular in shape and larger than the plate D, and may be provided with a handle or catch at its outer end, so as to prevent the fingers from coming in contact with the teeth upon its under side in setting it. The upper end of the trigger engages with the jaw when the trap is set, as shown, and at the same time with the outer end of the lever G. The slightest pressure upon the plate is sufficient to disengage the jaw from the trigger, when it descends upon the animal and holds it so that it cannot get away, if the animal is not killed outright. An animal simply running across the plate will be sufficient to set the jaw off and catch the animal, so that if the trap is set near a rat-hole an animal simply passing over the plate will be caught.

By extending the end of the base-board A beyond the block B and notching out the end of the base just under the end of the operating-lever G the base is made to protect the end lever from injury during transportation and when a number of traps are packed together.

Instead of the supports I for the bolt J, solid blocks S may be secured to the base, and then the bolt will be passed directly through these blocks, as shown in dotted lines in Fig. 1. These blocks both serve as guides to the movements of the arms O, and at the same time serve to take some of the pressure of the spring from the block B when the trap is set. These blocks serve to prevent the jaw P from having any lateral movement. Secured to the upper end of the standard is a hook T, which serves to hold the jaw in an upright position and prevent any possibility of it accidentally descending while the person is cleaning the trap or is covering it with dirt, so as to hide it from rats.

Having thus described my invention, I claim—

1. The combination of the base, the vertical support at its rear end, the horizontal lever pivoted to and above the said base and in front of the support and provided at its rear end with a hook and at its front end with a bait-plate, the vertical trigger pivoted upon the vertical support and provided at its upper and lower ends with hooks, the jaw which is held in an upright position by the upper hooked end of the trigger, and the spring, substantially as described.

2. The combination of the jaw provided with rearwardly-extending grooved arms, the pivoted bolt, the springs placed around the bolt and having their free ends placed in the said grooves, the horizontal pivoted bait-lever, and the pivoted trigger, all combined to operate in the manner shown and described.

In testimony whereof I affix my signature in presence of two witnesses.

ELMER E. SEELEY.

Witnesses:
ALEXANDER P. FOSTER,
IRA WILLIAMS.